United States Patent
Riede

(10) Patent No.: US 11,990,651 B2
(45) Date of Patent: May 21, 2024

(54) FUEL CELL ASSEMBLY HAVING A GAS DIFFUSION ELECTRODE SEPARATED FROM A MEMBRANE

(71) Applicant: AUDI AG, Ingolstadt (DE)

(72) Inventor: Nico Riede, Ludwigsburg (DE)

(73) Assignee: AUDI AG, Ingolstadt (DE)

( * ) Notice: Subject to any disclaimer, the term of this patent is extended or adjusted under 35 U.S.C. 154(b) by 545 days.

(21) Appl. No.: 17/279,507

(22) PCT Filed: Aug. 1, 2019

(86) PCT No.: PCT/EP2019/070743
§ 371 (c)(1),
(2) Date: Mar. 24, 2021

(87) PCT Pub. No.: WO2020/064184
PCT Pub. Date: Apr. 2, 2020

(65) Prior Publication Data
US 2021/0344021 A1   Nov. 4, 2021

(30) Foreign Application Priority Data

Sep. 25, 2018   (DE) ..................... 10 2018 216 266.2

(51) Int. Cl.
*H01M 8/0273* (2016.01)
*H01M 4/88* (2006.01)
(Continued)

(52) U.S. Cl.
CPC ....... *H01M 8/0273* (2013.01); *H01M 8/1004* (2013.01); *H01M 8/242* (2013.01);
(Continued)

(58) Field of Classification Search
CPC ............. H01M 8/1004; H01M 8/0273; H01M 4/8807; H01M 8/0271; H01M 8/242
See application file for complete search history.

(56) References Cited

U.S. PATENT DOCUMENTS 7,226,689 B2   6/2007   Ye et al.
2003/0082430 A1   5/2003   Suzuki
(Continued)

FOREIGN PATENT DOCUMENTS

JP   2015-115242 A   6/2015

*Primary Examiner* — Imran Akram
(74) *Attorney, Agent, or Firm* — Seed IP Law Group LLP

(57) ABSTRACT

A fuel cell assembly has a first gas diffusion layer on the cathode side, a second gas diffusion layer on the anode side, a membrane located between the first gas diffusion layer and the second gas diffusion layer, a first electrode located between the membrane and the first gas diffusion layer and a second electrode located between the membrane and the second gas diffusion layer, and a frame with a recess, held by means of an adhesive layer against the gas diffusion layers. One of the electrodes is arranged on one of the gas diffusion layers to form a gas diffusion electrode, while the other of the electrodes is arranged on the side of the membrane opposite the gas diffusion electrode to form a one-sided membrane electrode arrangement. The electrode-free side of the membrane is bound to the frame directly by the adhesive layer. A fuel cell device and a motor vehicle having a fuel cell device are also provided.

10 Claims, 4 Drawing Sheets

(51) Int. Cl.
  *H01M 8/1004* (2016.01)
  *H01M 8/242* (2016.01)
  *H01M 8/10* (2016.01)

(52) U.S. Cl.
  CPC .. *H01M 4/8807* (2013.01); *H01M 2008/1095* (2013.01); *H01M 2250/20* (2013.01)

(56) References Cited

U.S. PATENT DOCUMENTS

| | | | |
|---|---|---|---|
| 2007/0134536 A1* | 6/2007 | Takase | H01M 8/0263 429/514 |
| 2007/0286948 A1 | 12/2007 | Shimoda et al. | |
| 2008/0143061 A1 | 6/2008 | Steinbach et al. | |
| 2009/0104507 A1 | 4/2009 | Ohma et al. | |
| 2017/0018785 A1* | 1/2017 | Ohmori | H01M 8/0273 |
| 2017/0263952 A1 | 9/2017 | Terada et al. | |

* cited by examiner

FUEL CELL ASSEMBLY HAVING A GAS DIFFUSION ELECTRODE SEPARATED FROM A MEMBRANE

BACKGROUND

Technical Field

Embodiments of the invention relate to a fuel cell assembly having a first gas diffusion layer on the cathode side, having a second gas diffusion layer on the anode side, having an ion exchange membrane located between the first gas diffusion layer and the second gas diffusion layer, having a first electrode located between the ion exchange membrane and the first gas diffusion layer and a second electrode located between the ion exchange membrane and the second gas diffusion layer, and having a frame with a recess, held by means of an adhesive layer against the gas diffusion layers. Embodiments of the invention furthermore relate to a fuel cell device and a motor vehicle having a fuel cell device.

Description of the Related Art

A membrane electrode arrangement is shown in U.S. Pat. No. 7,226,689 B2, making use of a membrane coated on one side with a catalyst (one sided catalyst coated membrane (CCM)), being associated with a gas diffusion layer on the side having the catalyst and with a gas diffusion electrode on the opposite side, in order to create the possibility of supplementing PTFE on the uncoated side in order to increase the reversion tolerance.

In known fuel cell assemblies, a large expense is required to achieve a stable construction.

BRIEF SUMMARY

Embodiments of the invention modify a fuel cell assembly of the kind mentioned above so that its stability is enhanced. Furthermore, embodiments of the invention provide an improved fuel cell device and an improved motor vehicle.

Embodiments of the invention are characterized in that one of the electrodes is arranged on one of the gas diffusion layers to form a gas diffusion electrode, the other of the electrodes is arranged on the side of the membrane opposite the gas diffusion electrode to form a one-sided membrane electrode arrangement, and the electrode-free side of the membrane is bound to the frame directly by the adhesive layer. The direct connection of the membrane to the frame achieves an improved adhesion, which is not impaired by the electrode not being present on this side, while the required providing of the electrode is accomplished by the further formation of the gas diffusion layer as the gas diffusion electrode.

Furthermore, it may be advantageous that the gas diffusion electrode be adapted in its dimensions to the size of the recess, so that the formation of the layer carrying the catalyst beneath the adhesive layer is reduced and therefore some of the catalyst formed by a precious metal such as platinum, palladium, or ruthenium can be saved.

The gas diffusion electrode may be installed in the recess, such that an overall thickness of the fuel cell assembly is reduced.

The gas diffusion electrode may protrude through the recess and contact the adhesive layer on the side of the frame associated with the membrane.

Benefits of the direct adhesive action of the adhesive layer can be utilized when the electrode of the gas diffusion electrode is smaller in its dimensions than the associated gas diffusion layer and the recess, and when the electrode-free side of the membrane is bound directly by the adhesive layer to the gas diffusion layer positioned in the recess. This design in turn also decreases the quantity of catalyst required.

The reduction of the thickness of the fuel cell assembly is also shown when a first bipolar plate is arranged on the side of the first gas diffusion layer facing away from the frame, a second bipolar plate is arranged on the side of the second gas diffusion layer facing away from the frame, and a seal layer sealing off the gas diffusion layers at the periphery is arranged respectively between the frame and the two bipolar plates, while the first seal layer associated with the gas diffusion electrode has a reduced thickness relative to the second seal layer.

In particular, the improved stability and reduced overall thickness are also shown especially clearly when a plurality of fuel cells with a fuel cell stack as described above are assembled in a fuel cell device.

In this way, it is also possible to provide an improved motor vehicle having a fuel cell device.

BRIEF DESCRIPTION OF THE SEVERAL VIEWS OF THE DRAWINGS

Further benefits, features and details will emerge from the claims, the following description of several embodiments, and the drawings.

DETAILED DESCRIPTION

Figure 4:
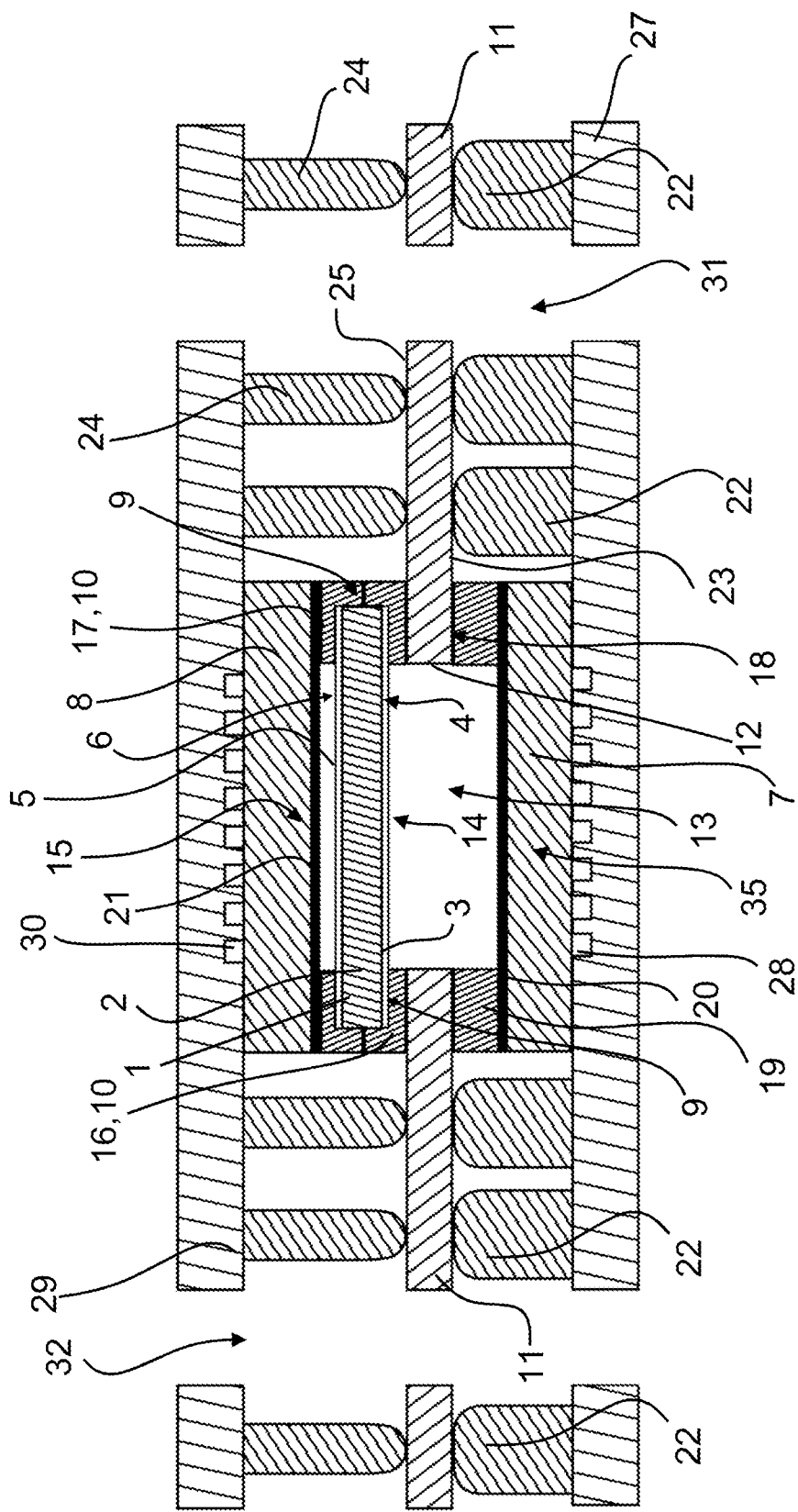
FIG. 4 illustrates a cross-sectional representation of another fuel cell assembly.

FIG. 4 shows the basic layout of a known fuel cell having a membrane electrode arrangement 1, comprising a semipermeable membrane 2 with a first electrode 3 on its first side 4 and a second electrode 5 on its second side 6 opposite the first side 4. The first electrode 3 in the example shown is formed as a cathode and the second electrode 5 as an anode; the converse arrangement of cathode and anode is likewise possible. The membrane 2 is coated on the first side 4 and on the second side 6 with a catalyst layer of precious metal or mixtures comprising precious metals such as platinum, palladium, ruthenium or the like, serving as reaction accelerants in the reaction of the fuel cell.

In such a polymer electrolyte membrane fuel cell (PEM fuel cell), fuel or fuel molecules, especially hydrogen, are split into protons and electrons at the second electrode 5 (anode). The membrane 2 allows the protons (e.g., $H^+$) to pass through, but it is impermeable to the electrons ($e^-$). The membrane 2 is formed from an ionomer, such as a sulfonated tetrafluorethylene polymer (PTFE) or a polymer of perfluorinated sulfonic acid (PFSA). The membrane 2 alternatively can also be formed as a hydrocarbon membrane. At the anode, the following reaction occurs: $2H_2 \rightarrow 4H^+ 4e^-$ (oxidation/electron donation).

While the protons pass through the membrane 2 and go to the first electrode 3 (cathode), the electrons are routed via an external circuit to the cathode or to an energy accumulator. At the cathode, a cathode gas is provided, especially oxygen or air containing oxygen, so that here the following reaction occurs: $O_2+4H^++4e^-\rightarrow 2H_2O$ (reduction/electron uptake).

The first electrode 3 is associated with a first gas diffusion layer 7 and the second electrode 5 is associated with a second gas diffusion layer 8. The gas diffusion layers may be formed of carbon fiber paper (CFP).

In order to improve a fluid or gas flow within the fuel cell assembly and increase the water content in the membrane, the first gas diffusion layer 7 is associated with a first microporous layer 20 on its side facing toward the first electrode 3. Likewise, the second gas diffusion layer 8 is associated with a second microporous layer 21 on its side facing toward the second electrode 5. The lateral dimensions of the microporous layers 20, 21 correspond basically to the lateral dimensions of the respective gas diffusion layer 7, 8.

In order to increase the stability of the fuel cell assembly, a frame 11 having a recess 12 is arranged between the first electrode 3 and the first gas diffusion layer 7. An active region 14 of the membrane electrode arrangement 1 is dictated by means of a flow cross section 13 dictated by the recess 12. In order to optimize the material consumption, in a configuration not otherwise shown, the area of the flow cross section 13 of the recess 12 corresponds to the area of the first electrode 3.

At the same time, the flow cross section 13 of the recess 12 has a smaller area than the area of a flow cross section 15 of the second gas diffusion layer 8. The flow cross section 35 of the first gas diffusion layer 7 corresponds basically to the flow cross section 15 or the cross section oriented orthogonally to the stacking direction of the second gas diffusion layer 8.

The membrane electrode arrangement 1 has an edge region 9 at its outer periphery. By the edge region 9 of the membrane electrode arrangement 1 is meant a region of the membrane electrode arrangement 1 surrounding the membrane electrode arrangement 1 at the outer periphery and extending partly orthogonally to the stacking direction.

In order to make possible a stable fuel cell assembly despite the material reduction, the membrane electrode arrangement 1 is joined to the second gas diffusion layer 8 only in the edge region 9 by means of an adhesive layer 10. Furthermore, the adhesive layer 10 encloses the membrane electrode arrangement 1 laterally in the edge region 9, that is, at the outer periphery; this being done entirely in the present case. The adhesive layer 10 has a U-shaped or C-shaped cross section and is formed from a first adhesive layer portion 16 and a second adhesive layer portion 17. The first adhesive layer portion 16 joins the membrane 2 in an edge region 9 of the membrane electrode arrangement 1 to an inner edge region 18 of the frame 11 provided near the recess 12. The inner edge region 18 of the frame 11 is formed as a partial region of the frame 11 extending outwardly in part at the inner circumference. The second adhesive layer portion 17 joins the second gas diffusion layer 8 to the second electrode 5 and the membrane 2 in the edge region 9 of the membrane electrode arrangement 1. Furthermore, a second adhesive layer 19 is provided, joining the inner edge region 18 of the frame 11 to the first gas diffusion layer 7. When the fuel cell arrangement is assembled, the two adhesive layer portions 16 and 17 melt together to form the common adhesive layer 10.

Furthermore, the second gas diffusion layer 8 at the anode side is associated with a second bipolar plate 29 for the supplying of the fuel gas, having a fuel flow field 30. By means of the fuel flow field 30, the fuel is supplied through the second gas diffusion layer 8 to the second electrode 5. At the cathode side, the first gas diffusion layer 7 is associated with a first bipolar plate 27 having a cathode gas flow field 28 for the supplying of the cathode gas to the first electrode 3.

The lateral extension, i.e., the extension perpendicular to the stacking direction, of the bipolar plates 27, 28 is larger than that of the gas diffusion layers 7,8 and corresponds basically to that of the frame 11. Between a first frame side 23 of the frame 11 and the first bipolar plate 27 there is arranged a first seal layer 22 sealing off the first gas diffusion layer 7 at the periphery. Between a second frame side 25 of the frame and the second bipolar plate 28 there is provided a second seal layer 24. The seal layers 22, 24 here are formed as compressible sealing lips, being present laterally in a plurality. In the present embodiment, each time three sealing lips are provided laterally, being arranged at the periphery around the first gas diffusion layer 7 and the second gas diffusion layer 8. The first seal layer 22 and the second seal layer 24 thus comprise a total of six sealing lips. A different number is possible. The sealing lips of the first seal layer 22 have a larger diameter than the sealing lips of the second seal layer 26.

Furthermore, laterally to the membrane electrode arrangement 1 there is provided a first duct 31 extending in the stacking direction through the first bipolar plate 27, the second bipolar plate 29 and the frame 11 for the supplying of the fuel and a second duct 32 for the supplying of the cathode gas to the fuel cell assembly. The ducts 31, 32 are arranged within the fuel cell assembly such that each time two sealing lips of the first seal layer 22 and two sealing lips of the second seal layer 24 are arranged at the inside on the side facing toward the gas diffusion layers 7, 8 and one sealing lip of the first seal layer 22 and one sealing lip of the second seal layer 24 are arranged at the outside on the opposite side.

Figure 1:
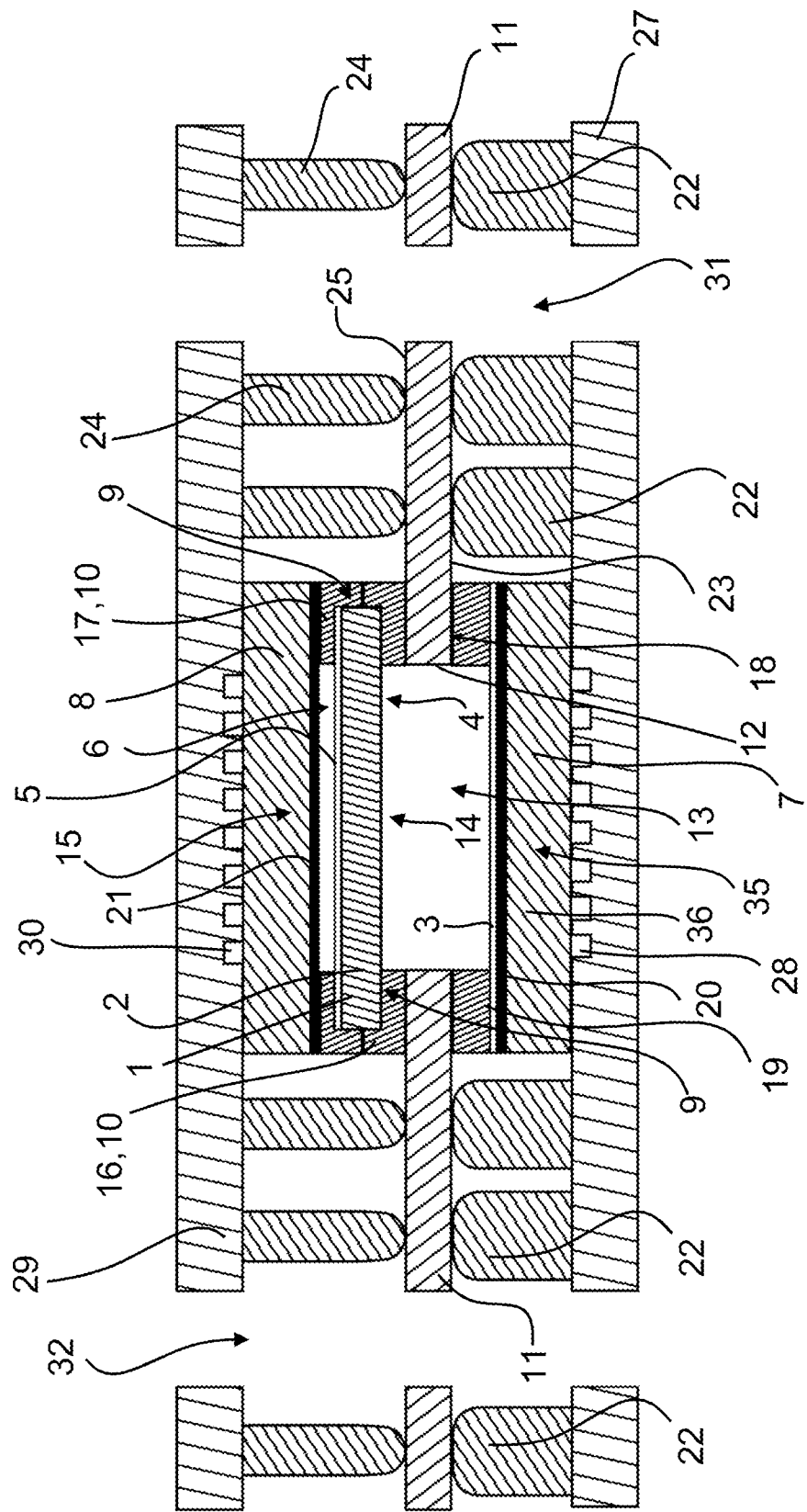
FIG. 1 illustrates a cross sectional representation of a fuel cell assembly.

FIG. 1 shows a first embodiment, in which one of the electrodes 3 is arranged on one of the gas diffusion layers 7 to form a gas diffusion electrode 36, the other of the electrodes 5 being arranged on the side of the membrane 2 opposite the gas diffusion electrode 36 to form a one-sided membrane electrode arrangement 1 (half coated catalyst coated membrane (CCM)), and the electrode-free side of the membrane 2 is bound directly by the adhesive layer 10 to the frame 11. This, in turn, serves for increasing the stability.

Figure 2:
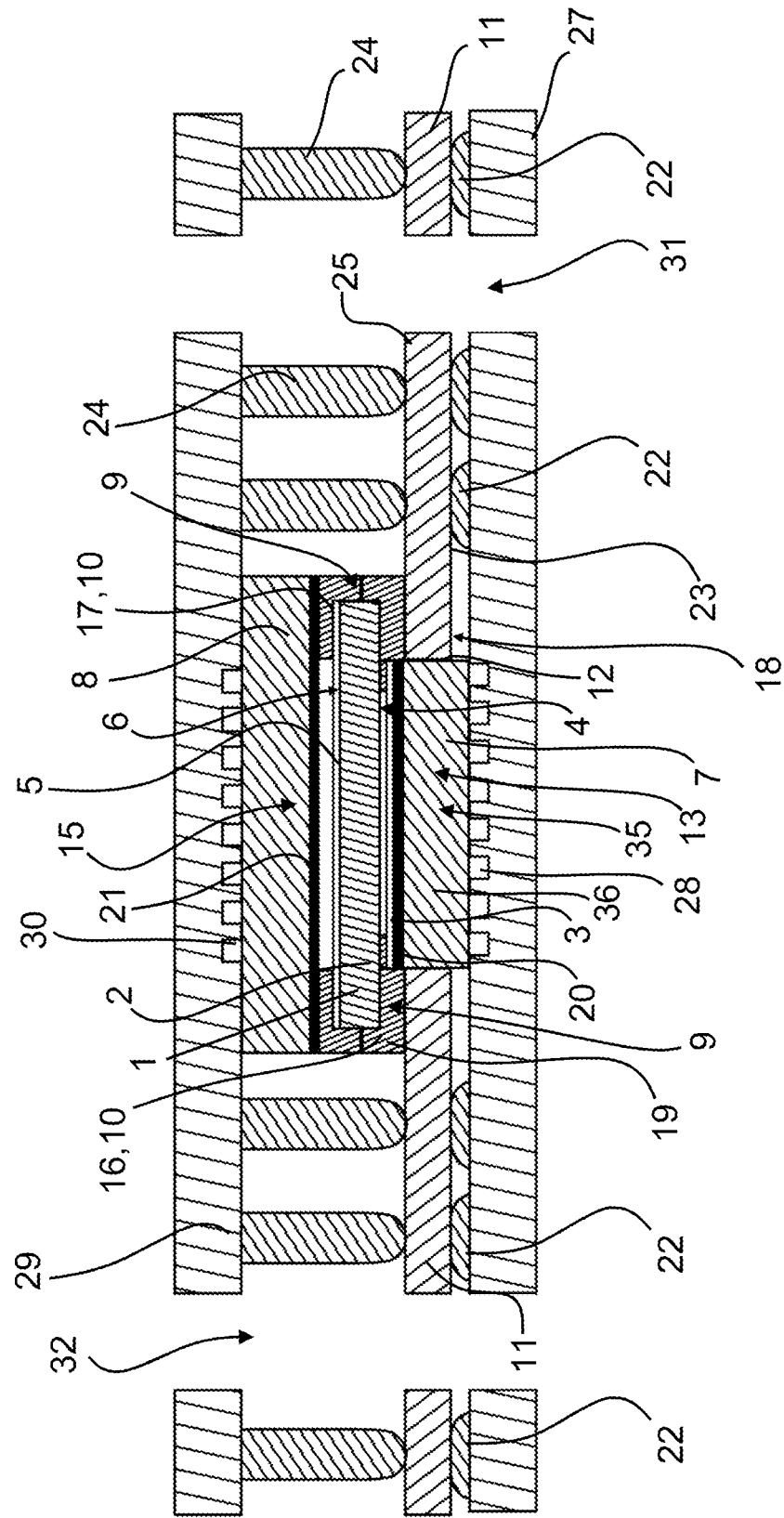
FIG. 2 illustrates a cross sectional representation of another fuel cell assembly.

FIG. 2 shows a fuel cell assembly in which the gas diffusion electrode 36 is adapted in its dimensions to the size of the recess 12 and it is installed in the recess 12, the gas diffusion electrode 36 protruding through the recess 12 and directly contacting the adhesive layer 10 on the side of the frame 11 facing toward the membrane 2, once again to increase the stability. A comparison with FIG. 1 also reveals that the overall thickness of the fuel cell assembly has been reduced, thus making possible a more compact structure.

Figure 3:
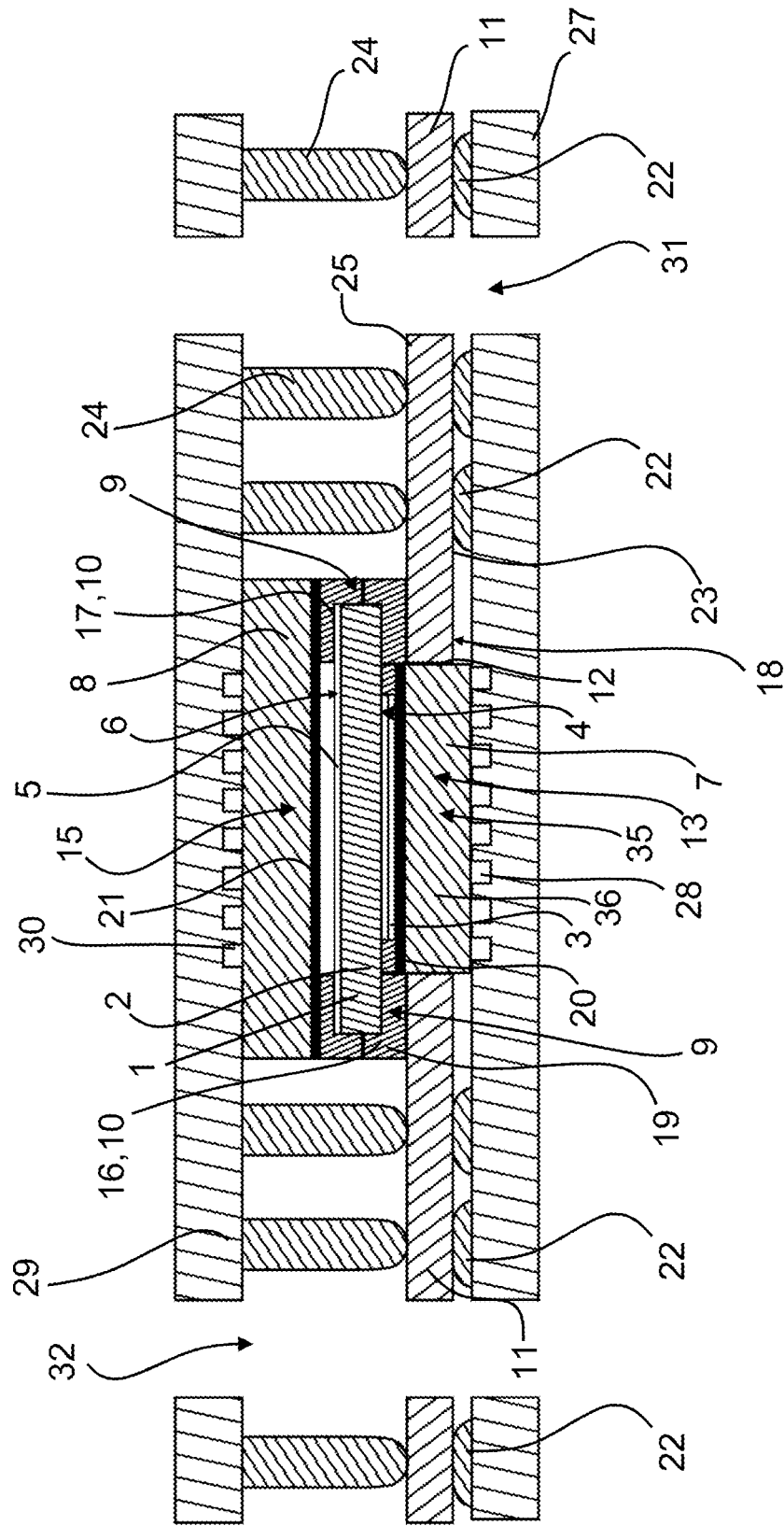
FIG. 3 illustrates a cross sectional representation of another fuel cell assembly.

FIG. 3 shows another embodiment, in which the electrode 3 of the gas diffusion electrode 36 is smaller in its dimensions than the associated gas diffusion layer 7 and the recess 12, the electrode-free side of the membrane 2 being bound directly by the adhesive layer 10 to the gas diffusion layer 7, positioned in the recess 12.

FIGS. 2 and 3 also show that a seal layer 22, 24 sealing off the gas diffusion layers 7,8 at the periphery is arranged each time between the frame 11 and the two bipolar plates 27, 29, the seal layer 22 associated with the gas diffusion electrode 36 having reduced thickness compared to the other seal layer 24.

The benefits described herein may be especially pronounced when a plurality of fuel cells are assembled into a fuel cell stack in a fuel cell device, since the reduced thickness and the improved stability add up. This also provides the improved suitability of using the fuel cell device in a motor vehicle.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
    a fuel cell assembly including:
        a cathode gas diffusion layer;
        an anode gas diffusion layer;
        a membrane located between the cathode gas diffusion layer and the anode gas diffusion layer;
        a cathode located between the membrane and the cathode gas diffusion layer;
        an anode located between the membrane and the anode gas diffusion layer; and
        a frame having a recess, the frame held by adhesive layers against the cathode and anode gas diffusion layers,
        wherein one of the cathode and the anode is arranged on one of the cathode and anode gas diffusion layers to form a gas diffusion electrode, wherein there is a gap between the gas diffusion electrode and the membrane such that the gas diffusion electrode is not in direct contact with the membrane;
        wherein the other of the cathode and anode is arranged on a side of the membrane opposite the gas diffusion electrode to form a one-sided membrane electrode arrangement, and an electrode-free side of the membrane is bound to the frame directly by the adhesive layer.

2. The fuel cell assembly according to claim 1, wherein the gas diffusion electrode is adapted in its dimensions to the size of the recess.

3. The fuel cell assembly according to claim 2 wherein the gas diffusion electrode protrudes through the recess and contacts the adhesive layer on the side of the frame associated with the membrane.

4. The fuel cell assembly according to claim 2, wherein the gas diffusion electrode is installed in the recess.

5. The fuel cell assembly according to claim 4, wherein the cathode or anode of the gas diffusion electrode is smaller in its dimensions than the associated gas diffusion layer and the recess.

6. The fuel cell assembly according to claim 5, wherein the electrode-free side of the membrane is bound directly by the adhesive layer to the gas diffusion layer positioned in the recess.

7. The fuel cell assembly according to claim 1, wherein a first bipolar plate is arranged on a side of the cathode gas diffusion layer facing away from the frame, a second bipolar plate is arranged on a side of the anode gas diffusion layer facing away from the frame, and a seal layer sealing off the gas diffusion layers at a periphery is arranged respectively between the frame and the two bipolar plates.

8. The fuel cell assembly according to claim 7, wherein the first seal layer associated with the gas diffusion electrode has a reduced thickness relative to the second seal layer.

9. A system, comprising:
    a fuel cell stack including a plurality of fuel cell assemblies, each of the fuel cell assemblies including:
        a cathode gas diffusion layer;
        an anode gas diffusion layer;
        a membrane located between the cathode gas diffusion layer and the anode gas diffusion layer;
        a cathode located between the membrane and the cathode gas diffusion layer;
        an anode located between the membrane and the anode gas diffusion layer; and
        a frame having a recess, the frame held by adhesive layers against the cathode and anode gas diffusion layers,
        wherein one of the cathode and the anode is arranged on one of the cathode and anode gas diffusion layers to form a gas diffusion electrode, wherein there is a gap between the gas diffusion electrode and the membrane such that the gas diffusion electrode is not in direct contact with the membrane;
        wherein the other of the cathode and anode is arranged on a side of the membrane opposite the gas diffusion electrode to form a one-sided membrane electrode arrangement, and an electrode-free side of the membrane is bound to the frame directly by the adhesive layer.

10. A system, comprising:
    a motor vehicle including a fuel cell stack including a plurality of fuel cell assemblies, each of the fuel cell assemblies including:
        a cathode gas diffusion layer;
        an anode gas diffusion layer;
        a membrane located between the cathode gas diffusion layer and the anode gas diffusion layer;
        a cathode located between the membrane and the cathode gas diffusion layer;
        an anode located between the membrane and the anode gas diffusion layer; and
        a frame having a recess, the frame held by adhesive layers against the cathode and anode gas diffusion layers,
        wherein one of the cathode and the anode is arranged on one of the cathode and anode gas diffusion layers to form a gas diffusion electrode, wherein there is a gap between the gas diffusion electrode and the membrane such that the gas diffusion electrode is not in direct contact with the membrane;
        wherein the other of the cathode and anode is arranged on a side of the membrane opposite the gas diffusion electrode to form a one-sided membrane electrode arrangement, and an electrode-free side of the membrane is bound to the frame directly by the adhesive layer.

* * * * *